(12) United States Patent
Takeya et al.

(10) Patent No.: US 11,048,451 B2
(45) Date of Patent: Jun. 29, 2021

(54) IMAGE FORMING DEVICE HAVING ADDITIONAL OPERATION MODE FOR ADDITIONAL MODULE

(71) Applicant: Oki Data Corporation, Tokyo (JP)

(72) Inventors: Hitoshi Takeya, Tokyo (JP); Tadayuki Watanabe, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 0 days.

(21) Appl. No.: 16/744,406

(22) Filed: Jan. 16, 2020

(65) Prior Publication Data
US 2020/0272368 A1    Aug. 27, 2020

(30) Foreign Application Priority Data
Feb. 25, 2019 (JP) .............................. JP2019-031247

(51) Int. Cl.
*G06F 3/12* (2006.01)

(52) U.S. Cl.
CPC .............. *G06F 3/123* (2013.01); *G06F 3/121* (2013.01)

(58) Field of Classification Search
None
See application file for complete search history.

(56) References Cited

U.S. PATENT DOCUMENTS

| 2008/0226327 A1* | 9/2008 | Moroi ................ H04N 1/00838 399/80 |
| 2014/0055801 A1 | 2/2014 | Tomono et al. |
| 2018/0084130 A1 | 3/2018 | Ikuno |

FOREIGN PATENT DOCUMENTS

JP          2014-042203 A       3/2014

* cited by examiner

*Primary Examiner* — Thomas D Lee
(74) *Attorney, Agent, or Firm* — Panitch Schwarze Belisario & Nadel LLP

(57) ABSTRACT

An image forming device includes a print unit, a reception data analysis unit that makes the print unit execute a first process when an operation mode of the image forming device is a previously provided standard operation mode, a control unit, and an additional module processing unit that executes an additional module and thereby makes the print unit execute a second process when the operation mode is an additional operation mode. The control unit sets the operation mode to the standard operation mode in a case where the additional module has not been installed at a time of startup of the image forming device and sets the operation mode to the additional operation mode in a case where the additional module has been installed at the time of startup of the image forming device.

6 Claims, 19 Drawing Sheets

IMAGE FORMING DEVICE HAVING ADDITIONAL OPERATION MODE FOR ADDITIONAL MODULE

CROSS-REFERENCE TO RELATED APPLICATION

This application claims priority under 35 U.S.C. § 119(b) to Japanese Patent Application No. 2019-031247, filed Feb. 25, 2019, the disclosure of which is incorporated herein by reference in its entirety.

BACKGROUND OF THE INVENTION

1. Field of the Invention

The present invention relates to an image forming device.

2. Description of the Related Art

Conventionally, there has been proposed an image forming device to which a new function can be added by installing an additional module as a program module provided from the outside (see Japanese Patent Application Publication No. 2014-42203 (see ABSTRACT for example), for example). The user can switch an operation mode of the image forming device to a standard operation mode based on a standard module incorporated at the stage of production (referred to also as a "normal operation mode") or an additional operation mode based on a newly installed additional module (referred to also as an "external operation mode").

SUMMARY OF THE INVENTION

However, in a case Where an additional module for supporting a page description language (PDL) which the standard module does not support is installed in the conventional device described above, the user using the image forming device needs to perform an operation for switching the operation mode. Here, to "support" means analyzing the PDL and executing requested commands by using internal functions of the image forming device. Thus, the conventional device has a problem of lacking convenience.

The object of the present invention, which has been made to resolve the above-described problem with the conventional technology, is to provide an image forming device having high convenience.

An image forming device according to an aspect of the present invention is a device that forms an image on a print medium, includes: an execution unit that executes a process; a first processing unit that makes the execution unit execute a first process when an operation mode of the image forming device is a previously provided standard operation mode; a storage unit; a control unit that stores an additional module in the storage unit by receiving a program module which operates on the image forming device and installing the program module; and a second processing unit that executes the additional module and thereby makes the execution unit execute a second process when the operation mode is an additional operation mode. The control unit sets the operation mode to the standard operation mode in a case where the additional module has not been installed at a time of startup of the image forming device and sets the operation mode to the additional operation mode in a case where the additional module has been installed at the time of startup of the image forming device.

According to the present invention, an image forming device having high convenience can be provided.

BRIEF DESCRIPTION OF THE DRAWINGS

In the attached drawings.

DETAILED DESCRIPTION OF THE INVENTION

Image forming devices according to embodiments of the present invention will be described below with reference to drawings. The image forming device according to each embodiment is a printer, a facsimile machine, a copy machine, a multi-function peripheral or the like, for example. The following embodiments are just examples for the purpose of illustration and a variety of modifications are possible within the scope of the present invention.

(1) First Embodiment (1-1) Configuration

Figure 1:
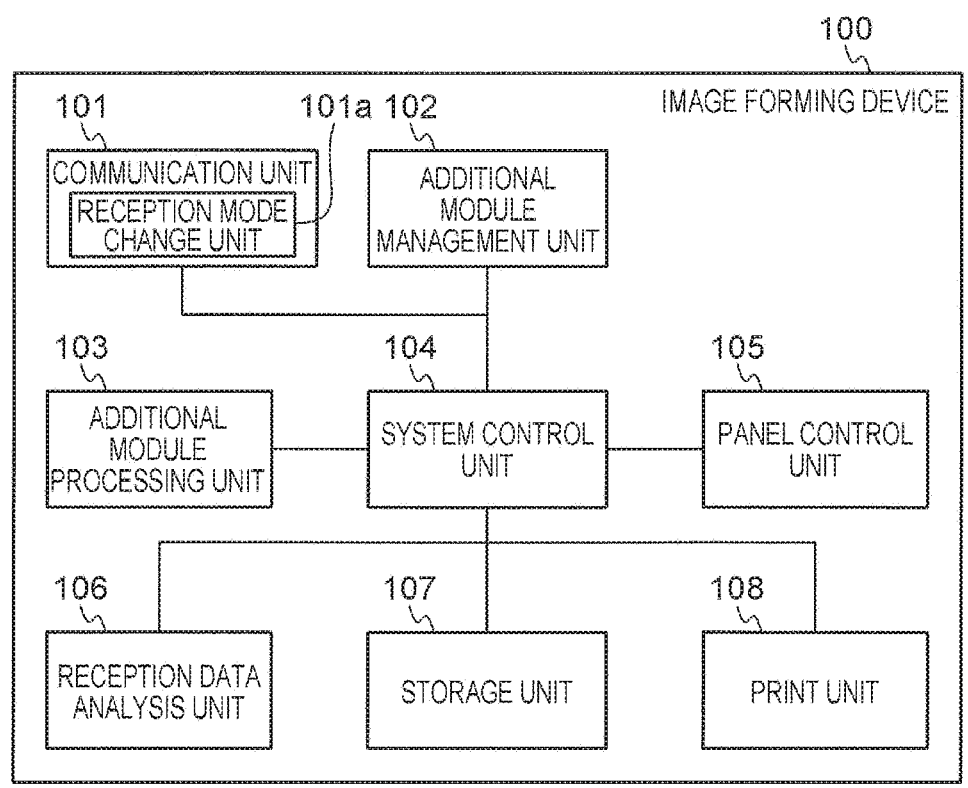
FIG. 1 is a functional block diagram schematically showing the configuration of an image forming device according to a first embodiment of the present invention.

FIG. 1 is a functional block diagram schematically showing the configuration of an image terming device 100 according to a first embodiment of the present invention in the first embodiment, a description will be given of a case where the image forming device 100 is a printer that forms an image on a sheet of paper as a print medium. As shown in FIG. 1, the image forming device 100 includes a communication unit 101 that performs communication with another device, an additional module management unit 102, an additional module processing unit 103, and a system control unit 104. Further, the image forming device 100 includes a panel control unit 105 that performs processing for information display oft a panel input/output unit (shown in FIG. 11 which will be explained later) such as a touch panel and processing for making the panel input/output unit receive user operations. Furthermore, the image forming device 100 includes a reception data analysis unit 106, a storage unit. 107, and a print unit 108 as an execution unit that executes a process for the printing. Incidentally, the communication unit 101, the additional module management unit 102, the system control unit 104 and the panel control unit 105 constitute a control unit that controls the operation of the image forming device 100.

The storage unit 107 includes a storage device capable of storing data in a nonvolatile manner, such as a flash memory, a hard disc drive (HDD) or a solid state drive (SSD), for example. Installation data is stored as a file in a prescribed path of a file system operating on the image forming device 100. The storage unit 107 also includes a volatile memory such as a RAM (Random Access Memory). However, the RAM may be provided in a different place such as in the additional module management unit 102, in the reception data analysis unit 106, or in the system control unit 104.

The communication unit 101 performs communication with an external device. The external device is, for example, a personal computer (PC) as a host. The communication unit 101 is communicably connected with the external device via a network, for example. The communication unit 101 receives various types of data such as a print job and installation data of an additional module as a program module for adding a function. The additional module is referred to also as an "external module" since the additional module is provided from a device outside the image forming device 100. The communication unit 101 includes a reception mode change unit 101a tact provides the received data to the reception data analysis unit 106 or the additional module management unit 102. Whether the communication unit 101 provides the received data to the reception data analysis unit 106 or the additional module management unit 102 will be described later.

The additional module management unit 102 installs the additional module as a program in the storage unit 107 by storing the installation data of the additional module received by the communication unit 101 in the storage unit 107. Incidentally, the installation data of the additional module is referred to also as "additional module data" or referred to also simply as an "additional module". At the startup of the image forming device 100, that is, when the power of the device is turned on, the additional module management unit 102 reads out the additional module data stored in the storage unit 107 and makes the additional module processing unit 103 execute the additional module.

The additional module processing unit 103 performs processing for acquiring received data, processing for various settings of the image forming device 100, processing for generating print data from received data, and so forth. The additional module processing unit 103 has a function as an interface used by the installed additional module for adding a function, and receives, requests from the additional module by use of the interface.

The panel control unit 105 controls, the operation of the panel input/output unit (shown in FIG. 11 which will be explained later). The panel input/output unit has a function as an input device for receiving operations by the user and a function as a display device for displaying the status of the image forming device 100, processing result, and so forth.

The reception data analysis unit 106 analyzes the data received by the communication unit 101 and performs a process according to the received data. In a case where the received data is a print job, the reception data analysis unit 106 generates print data based on the received data and provides the print data to the print unit 108. The print, unit 108 receives the print data based on the received data from the reception data analysis unit 106 and executes a print process based on the print data. The data that can be analyzed by the reception data analysis unit 106 is data described in a PDL such as PS (Postscript) or PCL (Printer Command Language), for example. These are data supported by the image forming device 100 according to its specifications.

The system control unit 104 performs centralized control over the communication unit 101, the additional module management unit 102, the additional module processing unit 103, the panel control unit 105, the reception data analysis unit 106, the storage unit 107 and the print unit 108 and thereby implements the functions as the image forming device 100.

The image forming device 100 is capable of storing the additional module data in the storage unit 107 by receiving a program module to operate on the image forming device 100 and installing the program module. The image forming device 100 is capable of operating in an operation mode corresponding to each of a plurality of PDLs. The image forming device 100 is set to a standard operation mode as an operation mode based on functions incorporated at the stage of production or an additional operation more as an operation mode based on functions provided by an additional module as a newly installed program module. The standard operation mode is referred to also as a "normal operation mode" or E "first operation mode". The additional operation mode is referred to also as an "external operation mode" or a "second operation mode". In the first embodiment, the storage unit 107 and the additional module management unit 102 constitute a second processing unit that makes the print unit 108 perform a process according to the additional operation mode. Further, in the first embodiment, the reception data analysis unit 106 constitutes a first processing unit that makes the print unit 108 perform a process according to the standard operation mode.

The image forming device 100 sets the operation mode to the standard operation mode in a case where no additional module data has been stored in the storage unit 107 at the time of startup, and sets the operation mode to the additional operation mode in a case where additional module data has been stored in the storage unit 107 at the time of startup.

Incidentally, the communication unit 101, the additional module management unit 102, the additional module processing unit 103, the system control unit 104, the panel control unit 105 and the reception data analysis unit 106 shown in FIG. 1 can be implemented by a program stored in the storage unit 107 and a processor as an information processing unit that executes the program. It is also possible to implement part of the communication unit 101, the additional module management unit 102, the additional module processing 14 unit 103, the system control unit 104, the panel control unit 105 and the reception data analysis unit 106 shown in FIG. 1 by a program stored in the storage unit 107 and a processor that executes the program.

(1-2) Operation

Figure 2:
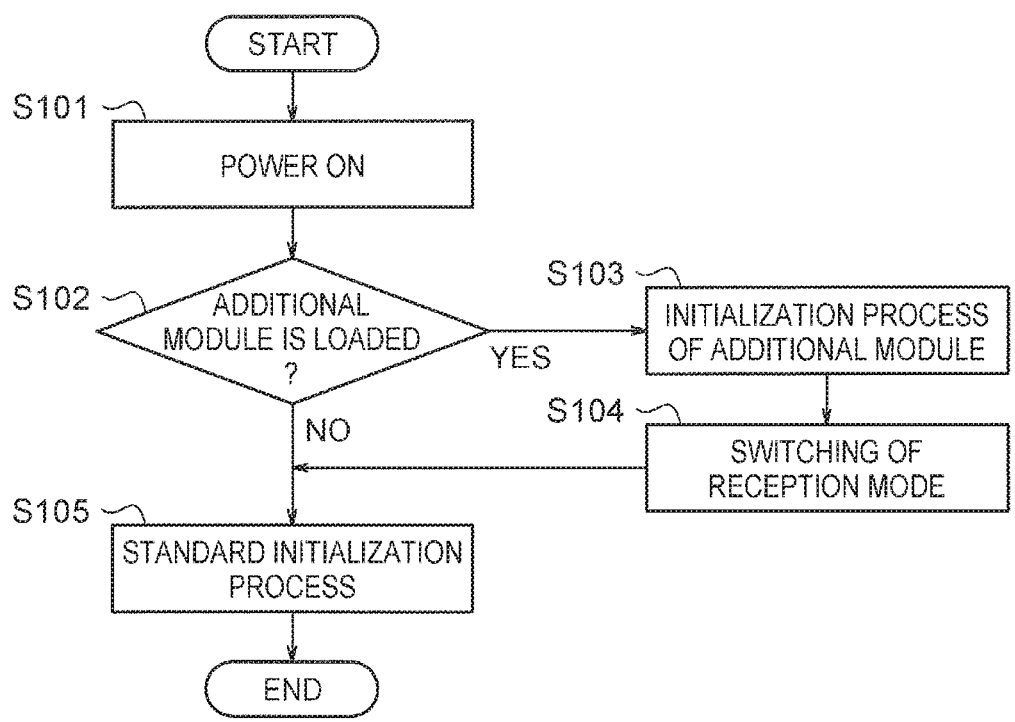
FIG. 2 is a flowchart showing an operation mode setting process in the image forming device according to the first embodiment.

FIG. 2 is a flowchart showing an operation mode setting process in the image forming device 100. At the startup of the image forming device 100. Whether additional module data has been stored in the storage unit 107 or not is judged. In a case where additional module data has been stored in the storage unit 107, the operation mode of the linage forming device 100 is set to the additional operation mode based on the additional module. In the first embodiment, the additional operation mode is an operation mode in which data described in a PDL usable by the additional module is received. In a case where no additional module data exists in the storage unit 107, the operation mode of the image forming device 100 is set to the standard operation mode based on a standard module provided at the stage of production.

The operation mode setting process will be described below with reference to FIG. 2. First, when a power switch (not shown) of the image forming device 100 is turned on by a user operation, the image forming device 100 starts an initialization operation (step S101). In the first embodiment, the initialization operation includes an operation of setting a reception mode as an operation mode by the reception mode change unit 101a.

Subsequently, the system control unit 104 requests the additional module management unit 102 to perform an initialization process, and the additional module management unit 102 in response to this request judges whether or not additional module data has been stored in the storage unit 107 (step S102). In a case where additional module data has been stored in the storage unit 107 and no standard operation mode request at the time of the next startup has been made, the additional module management unit 102 loads the additional module data from the storage unit 107. Here, the "standard operation mode request at the time of the next startup" is command information requesting a startup in the standard operation mode at the time of the next startup. The "standard operation mode: request at the time of the next startup" is referred to also as a "normal startup request". In the first embodiment, the standard operation mode is an operation mode in which data described in a PDL usable by the standard module as a module installed at the stage of production is received.

In a case where the additional module data is loaded, the additional module management unit 102 develops the loaded additional module data in the RAM, links the additional module as a program based on the developed additional module data with a standard program of the image forming device 100 dynamically, and starts the operation of the additional module (step S103).

Subsequently, the additional module management unit 102 requests the communication unit 101 to set the operation mode of the reception mode change unit 101a to the additional operation mode as the operation mode based on the additional module (step S104). The additional operation mode in the reception mode change unit 101a is referred to also as an "additional reception mode".

The communication unit 101 holds information indicating that a request for setting the operation mode to the additional operation mode was made. The image forming device 100 sets the operation mode at the time of data reception after the completion of the startup to the additional operation mode. Incidentally, details of the process at the time of data reception will be described later. After the setting of the operation mode is made, a standard initialization process is performed (step S105). The process at the startup of the image forming device 100 is completed as above.

Incidentally, in a case where no additional module has been stored in the storage unit 107 or an additional module data has been stored but there is the standard operation mode request at the time of the next startup in the step S102, the additional module management unit 102 does not load the additional module, only the standard initialization process of the image forming device 100 is performed, and the startup process is completed (step S105).

The additional operation mode is an operation mode for making the additional module in the additional module processing unit 103 (shown in FIG. 4 which will be explained later) acquire the received data. The standard operation mode is an operation mode for making the reception data analysis unit 106, width performs a standard reception process of the image forming device 100, acquire the received data.

Figure 3:
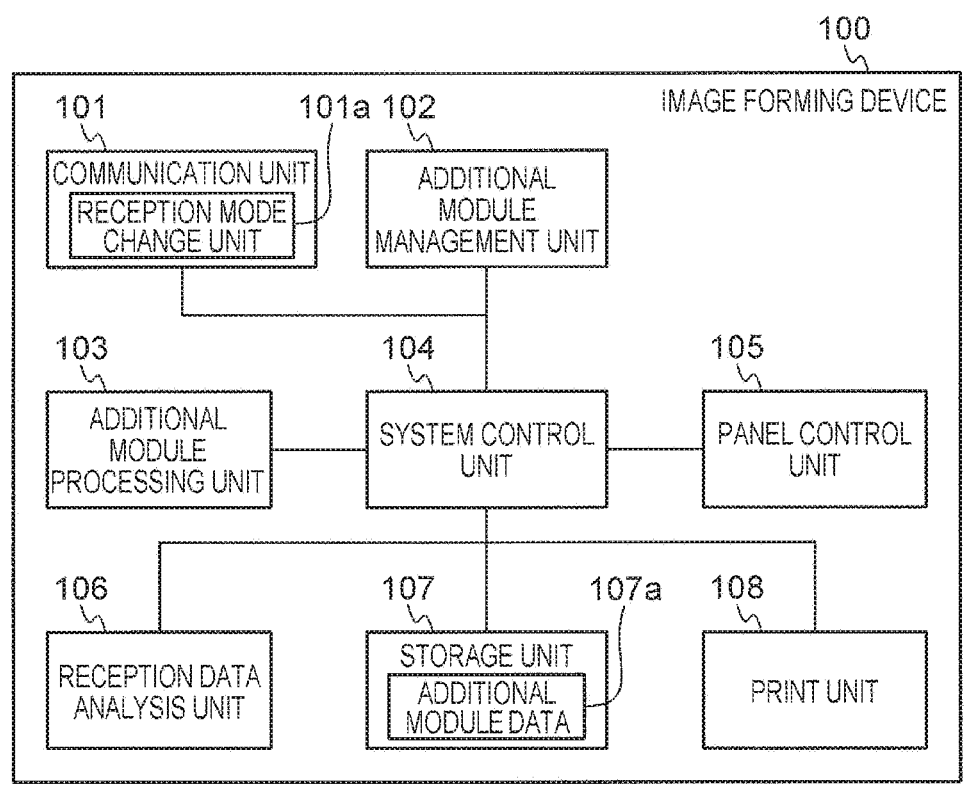
FIG. 3 is an explanatory drawing showing a state of the image forming device according to the first embodiment in which an additional module has been installed.

FIG. 3 is an explanatory drawing showing a state of the image forming device 100 according to the first embodiment in which the additional module data 107a has been installed. FIG. 3 shows a state in which the additional module data 107a as installation data has been installed in the device and the additional module data 107a has been stored in the storage unit 107. In this state, the additional module management unit 102 is capable of judging whether the additional module data 107a has been installed in the image forming device 100 or not by judging whether or not a file has been stored in a prescribed path.

Figure 4:
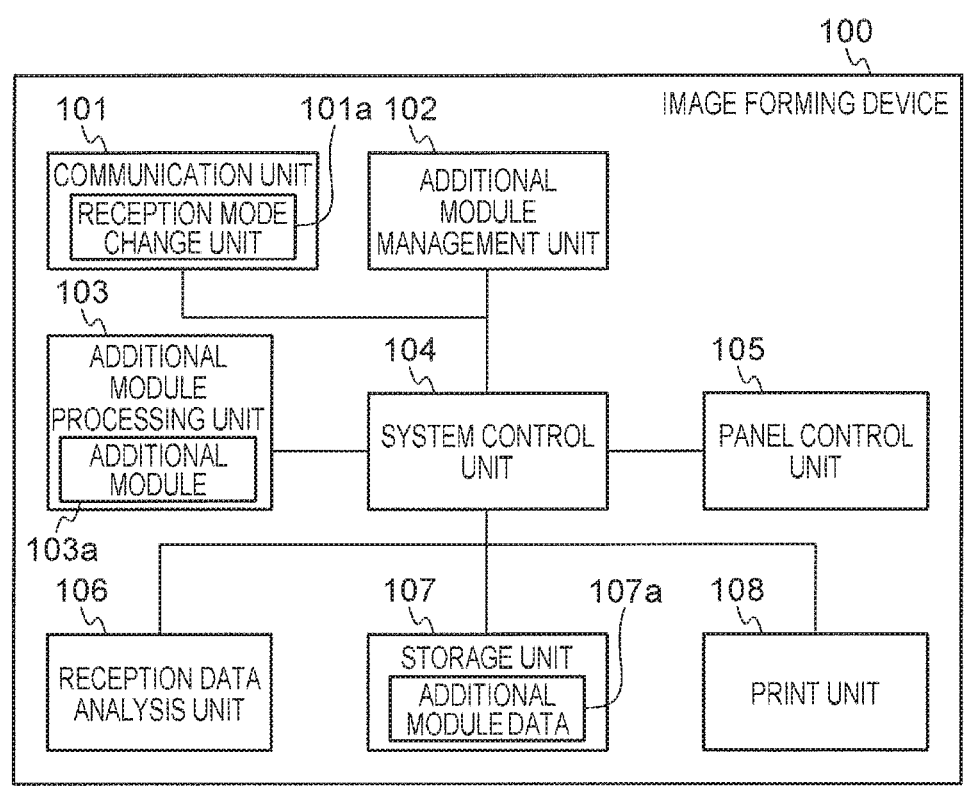
FIG. 4 is an explanatory drawing showing a state of the image forming device according to the first embodiment at the time of device startup after the installation of the additional module.

FIG. 4 is an explanatory drawing showing a state of the image forming device 100 according to the first embodiment at the time of device startup after the installation of the additional module data 107a. FIG. 4 shows a state when the additional module data 107a has been developed in the RAM of the additional module processing unit 103 in the step S103 in FIG. 2 and the operation as the additional module 103a as a program has been started.

At the device startup, the additional module management unit 102 executes an initialization process of the additional module 103a. The additional module 103a implements an additional function by calling up a function as an interface for making an internal process of the additional module processing unit 103 usable. Here, the internal process includes, for example, a process for changing and acquiring setting information on the image forming device 100, a process for receiving reception data corresponding to an image to be formed on a print medium, generating print data from the reception data, and providing the print data to the print unit 108, and so forth.

By the above-described process, the image forming device 100 reads out the additional module 103a based on the installed additional module data 107a at the time of startup, makes the additional module 103a operate as a program, and sets the operation mode of the reception mode change unit 101a to the additional operation mode.

Figure 5:
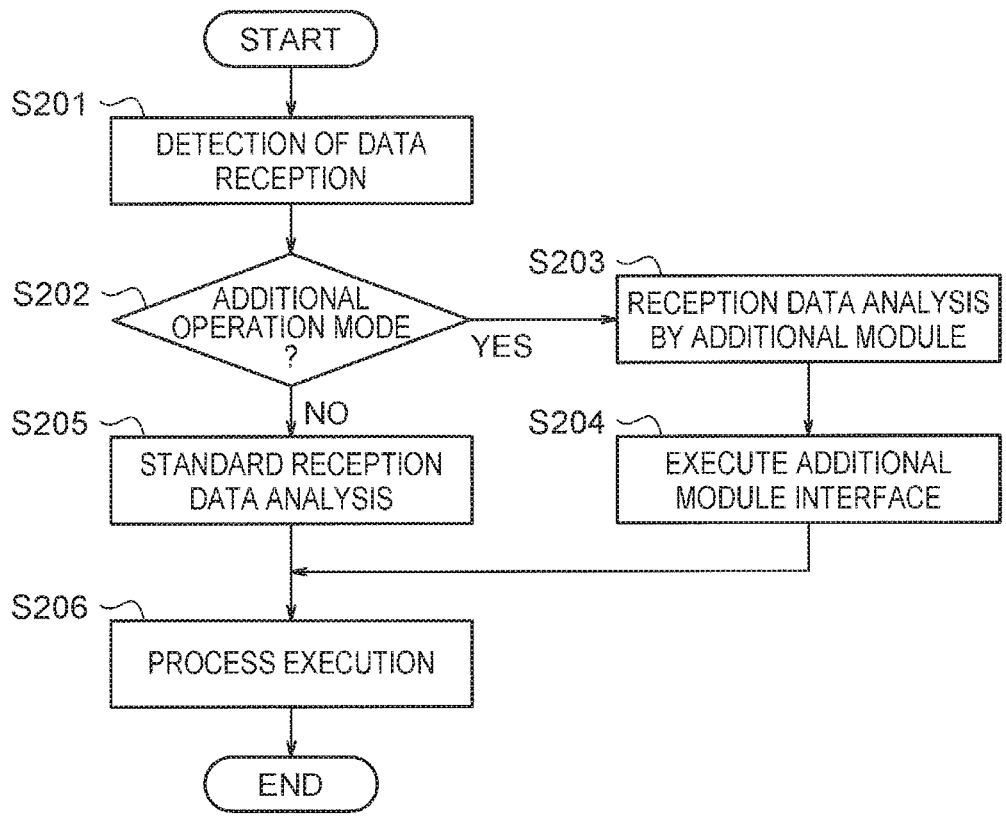
FIG. 5 is a flowchart showing a process in the image forming device according to the first embodiment at the time of data reception.

FIG. 5 is a flowchart showing a process in the image forming device 100 at the time of data reception. First, when data is transmitted to the image forming device 100 from a PC or the like as a host, the communication unit 101 detects reception of the data (step S201).

The reception mode change unit 101a of the communication unit 101 judges whether the operation mode has been switched to the additional operation mode (i.e., the additional reception mode) or not (step S202). This judgment is made by the communication unit 101 based on operation mode information that indicates whether a switching request for the switching to the additional operation mode was made or not in the processing of the step S104 shown in FIG. 2.

In a case where the operation mode is the additional operation mode in the step S202, the communication unit 101 notifies the additional module processing unit 103 of the reception of the data. The additional module processing unit 103 notifies the additional module 103a, operating by the process at the time of startup shown in FIG. 2, of the reception of the data. Based on the notification of the reception of the data, the additional module 103a acquires the reception data and analyzes the reception data (step S203).

As a method for the data reception notification from the additional module processing unit 103 to the additional module 103a, it is possible for the additional module 103a to previously register a call back for notifying the additional module processing unit 103 of the data reception in the additional module initialization operation in the step S103 shown for example. When the notification of data reception is received from the communication unit 101, the additional module processing unit 103 notifies of the data reception by calling up the previously registered call back. Based on the result of the analysis of the received data, the additional module 103a calls up an additional module interface as an interface provided by the additional module processing unit 103 (step S204) and has an internal process of the image forming device 100 executed (step S206). Here, the internal process includes, for example, a process for changing and acquiring the setting information on the image forming device 100, a process for internally generating print data and performing a print operation, and so forth. In a case of the internal process, the additional module processing unit 103 executes a process of requesting the print unit 108 to perform the print operation.

In a case where the operation mode is not the additional operation mode in the step S202, that is, in a case where the operation mode is the standard operation mode, the communication unit 101 notifies the reception data analysis unit 106 of the received data. The reception data analysis unit 106 analyzes the received data (step S205) and has an internal process of the image forming device 100 be executed based on the result of the analysis (step S206).

By the above-described process, the image forming device 100 automatically switches the operation mode and executes the reception operation. Thus, in a case where the operation mode is the standard operation mode, the additional module 103a does not execute the process regarding data analysis. In contrast, in a case where the operation mode is the additional operation mode, the reception data analysis unit 106 does not execute the process regarding data analysis.

Figure 6:
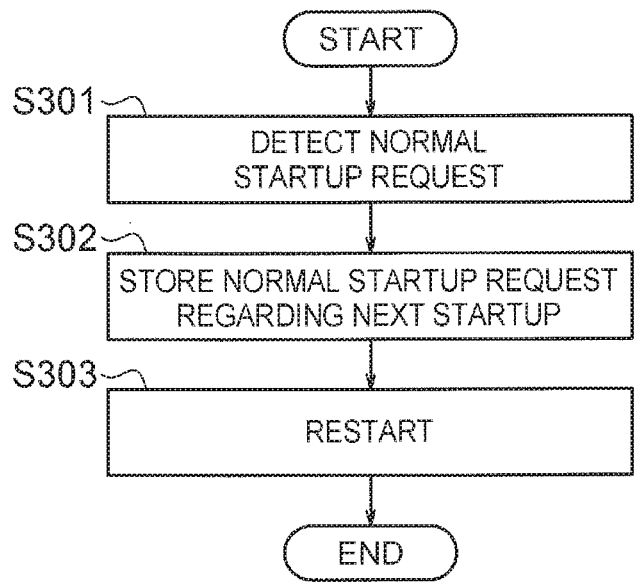
FIG. 6 is a flowchart showing a process in the image forming device according to the first embodiment at the time of the startup in a case where additional module data has been stored but there is a standard operation mode request at the time of the next startup.

FIG. 6 is a flowchart showing a process at the time of startup of the image forming device in a case where additional module data has been stored hut there is the standard operation mode request at the time of the next startup. First, the additional module processing unit 103 detects the standard operation mode request at the time of the next startup (step S301). The additional module processing unit 103 has provided one of its interfaces to the additional module 103a, the additional module 103a calls up the standard operation mode request at the time of the next startup and thereby the standard operation mode request at the time of the next startup can be detected. The standard operation mode request at the time of the next startup may also be sent from the panel control unit 105 to the additional module processing unit 103 via the system control unit 104 in response to a user operation on the panel input/output unit (shown in FIG. 11 which will be explained later).

The additional module processing unit 103 stores the standard operation mode request at the time of the next startup in the storage unit 107 in a nonvolatile manner (step S302).

Thereafter, the image forming device 100 is restarted, and thereby an operation based on the standard operation mode request at the time of the next startup is executed (step S303).

Specifically, at the time of the restart, in the step S102 shown in FIG. 2, the additional module management unit 102 judges whether or not data indicating the standard operation mode request at the time of the next startup has been stored in the storage unit 107. In a case where there is no data indicating the standard operation mode request at the time of the next startup, the additional module management unit 102 at the time of startup does not load the additional module data 107a, and accordingly, the image forming device 100 starts up in the standard operation mode even in a case where an additional module has been installed.

In this case, the additional module management unit 102 deletes the data indicating that there was the standard operation mode request at the time of the next startup. This is to make a setting so that the image forming device 100 starts up in the additional operation mode at the time of the next startup. Incidentally, it is also possible not to perform the process of deleting the data indicating that there was the standard operation mode request at the time of the next startup until a prescribed operation is performed by the user. In this case, the image forming device 100 starts up in the standard operation mode until the prescribed operation is performed by the user. In this case, the image forming device 100 in the state in which the additional module has been installed can be temporarily used as the image forming device operating in the standard operation mode.

Figure 7:
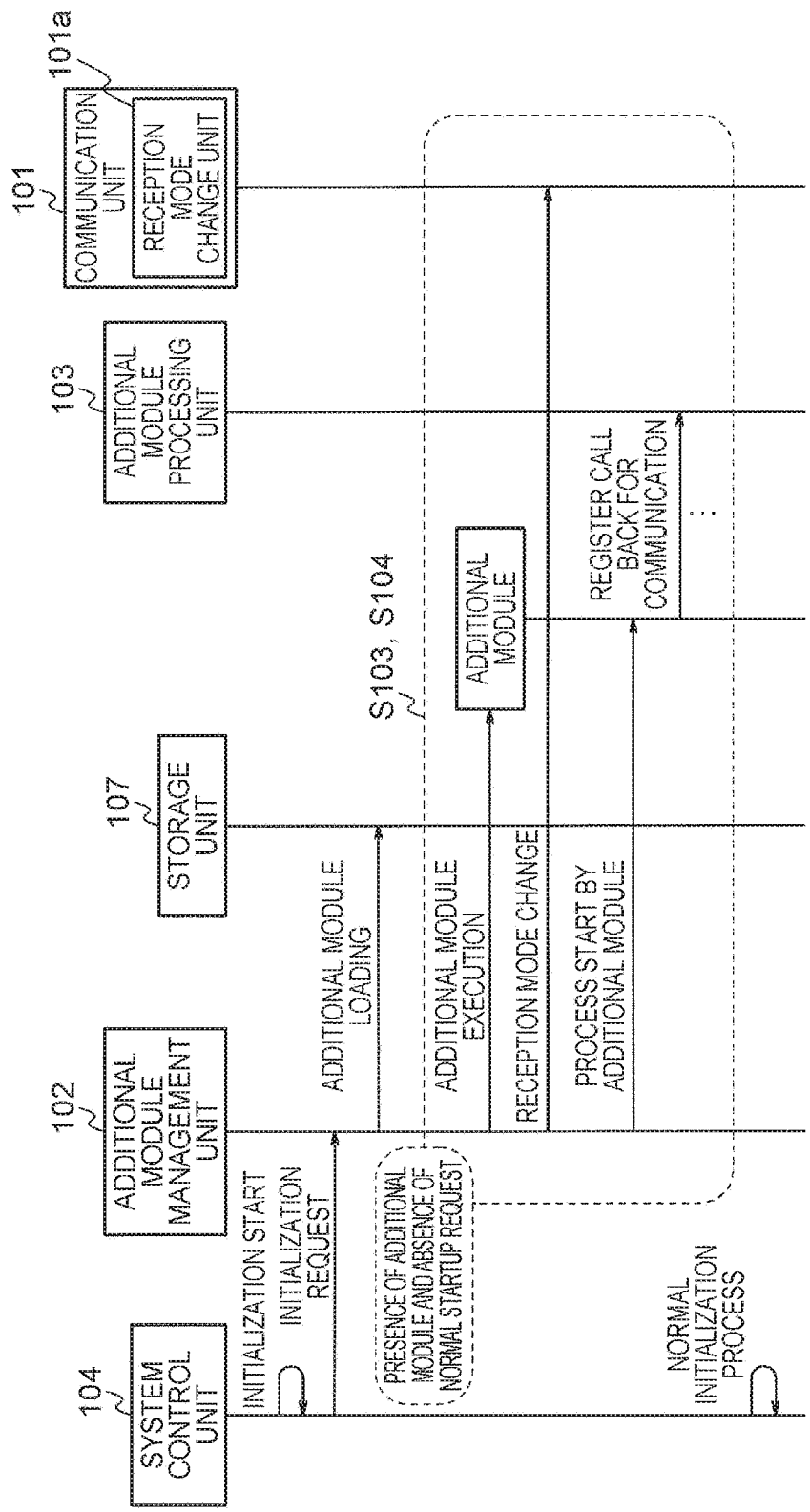
FIG. 7 is a sequence chart showing a process at the time of device startup in an additional operation mode performed by the image forming device according to the first embodiment.

FIG. 7 is a sequence chart showing a process at the time of device startup in the additional operation mode performed by the image forming device 100. FIG. 7 Shows a process corresponding to the process shown in FIG. 2. In FIG. 7, the part surrounded by broken lines corresponds to the steps S103 and S104 in FIG. 2.

Figure 8:
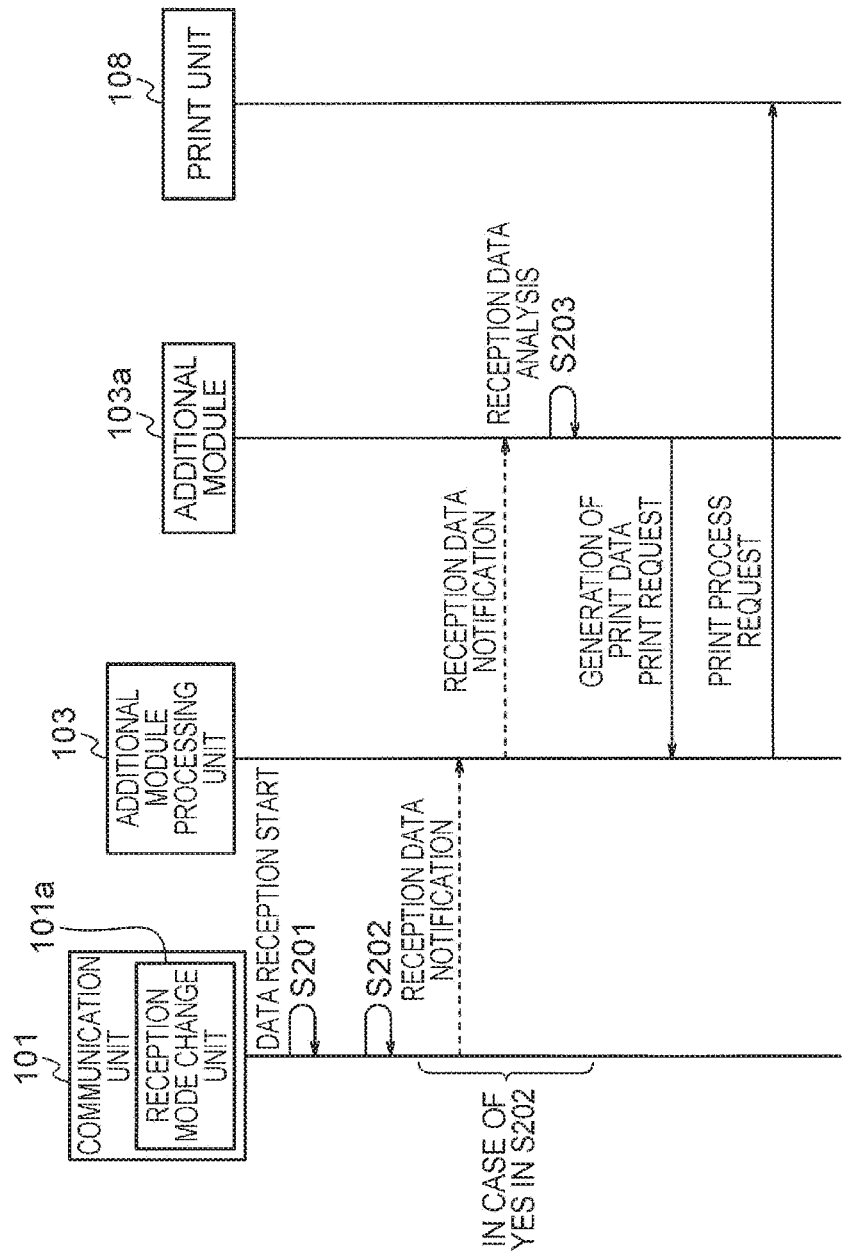
FIG. 8 is a sequence chart showing a process at the time of data reception performed by the image forming device according to the first embodiment.

FIG. 8 is a sequence chart showing a process at the time of data reception performed by the image forming device 100. FIG. 8 shows a process corresponding to the process shown in FIG. 5. The process shown in FIG. 8 is an example in a case where the image forming device 100 starts up in the additional operation mode and the data analyzed by the additional module 103a is data requesting a print process. In FIG. 8, the process denoted by "GENERATION OF PRINT DATA", "PRINT REQUEST", and "PRINT PROCESS REQUEST" Corresponds to an example of the process of the step S204 an FIG. 5.

Figure 9:
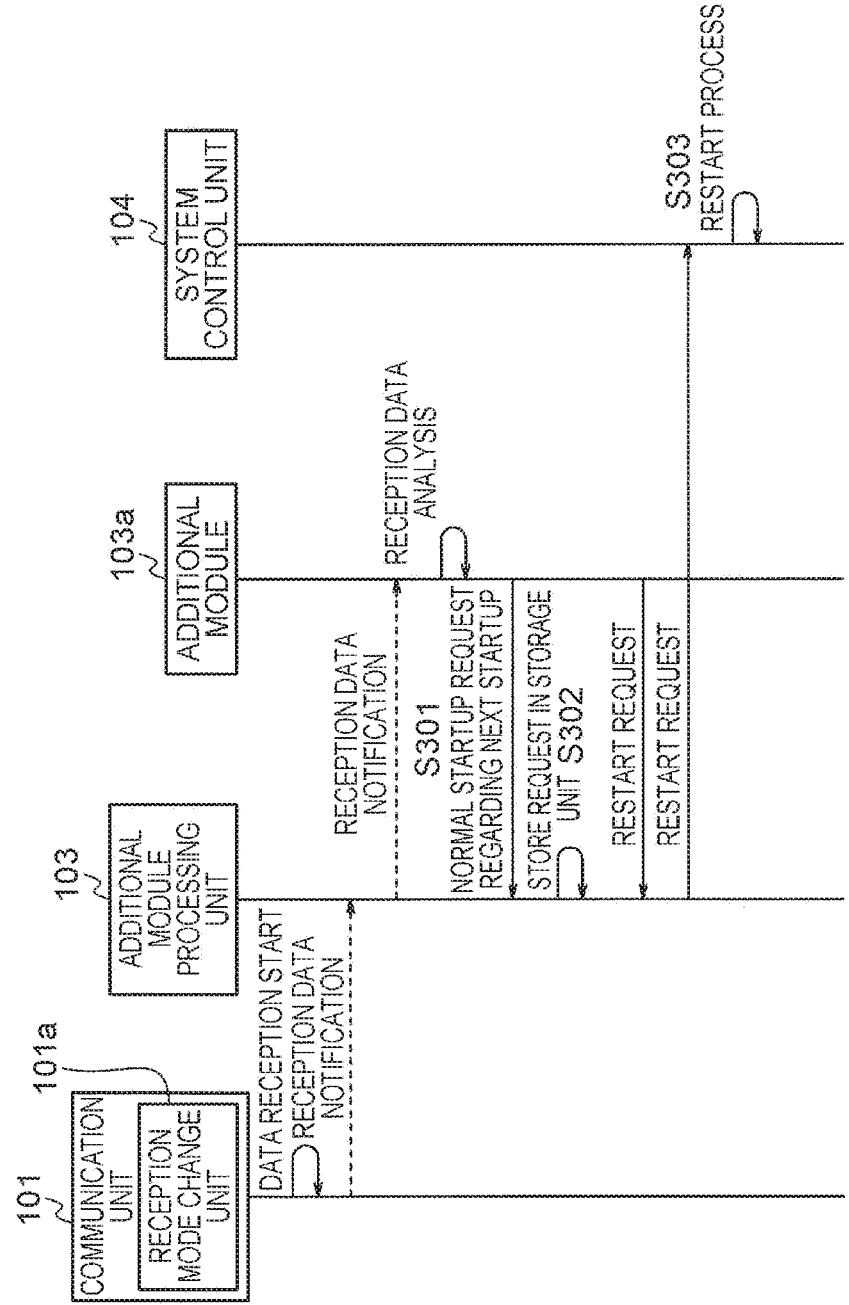
FIG. 9 is a sequence chart showing a process at the time of device startup in a standard operation mode performed by the image forming device according to the first embodiment.

FIG. 9 is a sequence chart showing a process at the time of device startup in the standard operation mode performed by the image forming device 100. FIG. 9 shows a process corresponding to the process shown in FIG. 6. The process of FIG. 9 shows an example in which the device was restarted in the additional operation mode and then the device is started up in the standard operation mode since the standard operation mode request at the time of the next startup exists. Incidentally, in FIG. 9, the device starts up in the standard operation mode after the restart (step S303).

Figure 10:
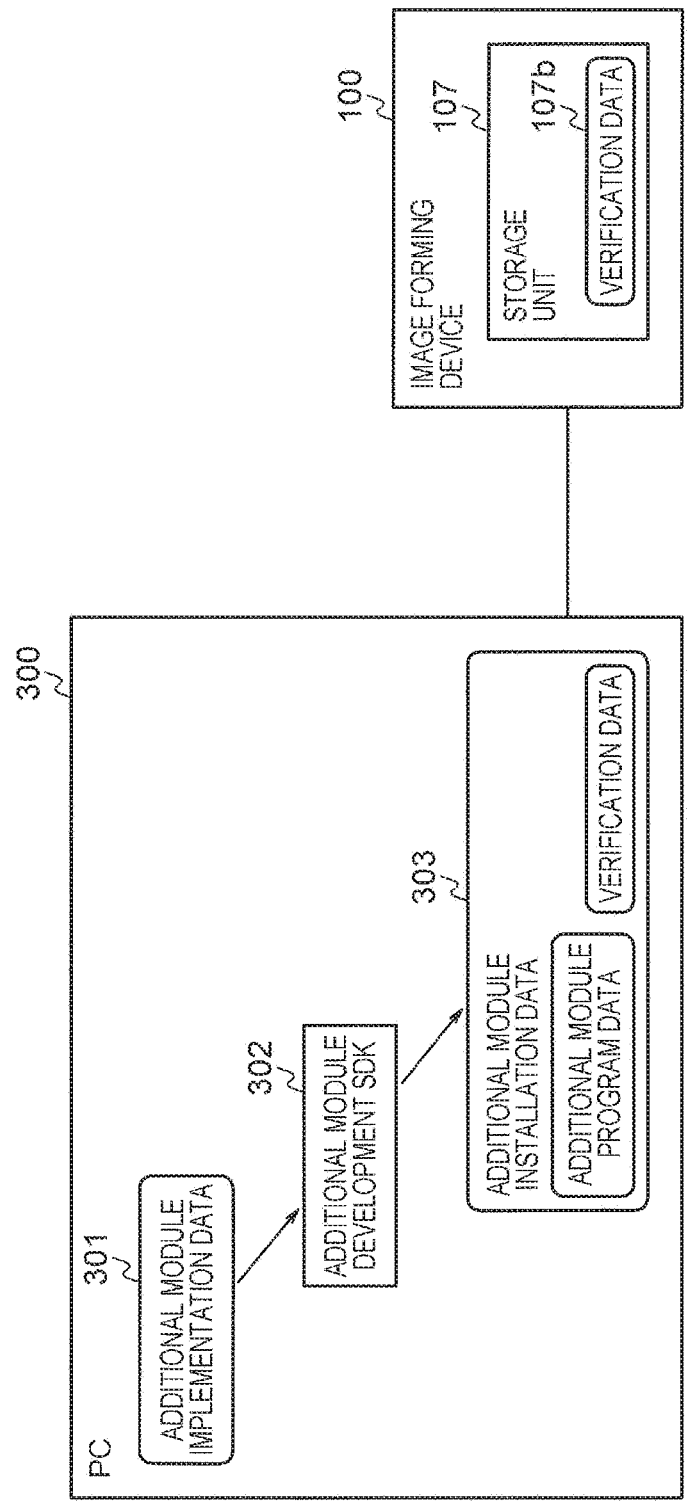
FIG. 10 is an explanatory drawing showing a state when the image forming device according to the first embodiment receives an additional module from a PC as a host and installs the additional module.

FIG. 10 is an explanatory drawing showing a state when the image forming device 100 receives an additional module from a PC 300 as a host and installs the additional module. FIG. 10 also shows verification data for verification at the time of installation. FIG. 10 shows an example of generating installation data 303 of the additional module from additional module implementation data 301 by using an SDK (Software Development Kit) 302 for additional module development. The developer of the additional module generates the external module installation data 303 from the implementation data 301 of the additional module by using the SDK 302 for the additional module development. Here, the implementation data 301 of the additional module is, for example, a file described in a programming language such as the C language. The SDK 302 for the additional module development converts the file of the implementation data 301 into program data that operates on the image forming device 100, namely, data in a format processed by the reception data analysis unit 106 as the installation data 303 of the additional module in the standard operation mode of the image forming device 100. In this case, information indicating that the data is the installation data of the additional module is added as data of a prescribed size at the front end of the installation data 303 of the additional module.

In FIG. 10, the installation data 303 of the external module includes the verification data. When the additional module is installed in the image forming device 100, the additional module management unit 102 judges whether or not to permit the installation of the installation data as the installation object in the image forming device 100. The contents of the verification can include verification on whether or not the installation data is installation data developed by an authorized authentic SDK (namely, verification of authenticity), whether or not the installation data is not broken (namely, verification of completeness), whether or not the version of the interface of the additional module processing unit 103 and the version of the SDK coincide with each other, and so forth.

In the example of FIG. 10, verification data 107b identical with the verification data of the installation data 303 of the external module generated by the SDK 302 is stored in the storage unit 107 of the image forming device 100. The additional module management unit 102 compares the verification data included in the installation data with the verification data 107b stored in the storage unit 107, and when the two pieces of verification data coincide with each other, judges that the additional module is a program that has been authorized to be used as an additional module.

By having the verification data included in both of the image forming device 100 and the SDK 302 according to the shipment destination, it is possible to prevent installation of an erroneous additional module, which should not be used as an additional module, in the image forming device 100 after the shipment. The verification data can be generated, for example, as a hash value calculated from the generated program data by using a hash function. In this case, the additional module management unit 102 may perform an operation of calculating the hash value by using the same hash function as that of the SDK 302, which eliminates the need of previously storing the verification data in the storage unit 107. The verification by the additional module management unit 102 may be conducted not only at the time of installation of the additional module but also at every startup of the image forming device 100.

In the step S102 shown in FIG. 2, it is also possible to conduct the verification of the installation data of the additional module by use of the verification data and carry out the loading of the additional module if the verification data coincide with each other. This process makes it possible to prevent the device from operating in the additional operation mode in cases where the additional module data was stored in the storage unit 107 but broken, the additional module data was stored in the storage unit 107 by an unexpected method for which the process by the additional module management unit 102 at the time of installation is not executed, or the like.

In a case where the loading of the additional module is not permitted as the result of the aforementioned verification at the time of startup, the panel control unit 105 may perform a process of displaying an error message, indicating that the startup in the additional operation mode is not permitted, on the panel input/output unit (shown in FIG. 11 which will be explained later).

Further, even in a case where the firmware (FW) of the image forming device 100 has been updated and the interface provided by the additional module processing unit 103 has been expanded, it is possible to install an additional module generated by the SDK before the update and perform the operation at the time of startup in the additional operation mode. In this case, however, it is desirable to perform a notification process for notifying the user of information prompting the updating of the additional module. The notification process is a display on the panel input/output unit, for example.

Furthermore, it is also possible to form the verification data to include information indicating the version of the interface of the additional module processing unit 103 and make the additional module management unit 102 judge whether to make the notification of the information prompting the updating of the additional module or not by using the version information.

While the process of the verification at the time of installation of the additional module has been described above, the device that generates the additional module is not limited to an SDK but can be a server for generating the additional module that inputs a file of a program and outputs the installation data of the external module, for example. While a case where the additional modulo data is stored in the storage unit 107 has been described in the first embodiment, it is also possible for example, to provide an additional module management server and make the image forming device 100 at the time of startup access the server and load the data of the additional module.

(1-3) Effect

As described above, with the image forming device 100 according to the first embodiment, by installing an additional module, a prints process based of data other than data supported by the image forming device 100 in a standard setting can be executed.

Further, in a case where a special type of data is handled in a system formed by the image forming device 100 and a host such as a PC or a server, it is sufficient to develop only an additional module that analyzes the special type of data as an additional module used in place of a general-purpose printer or MFP. Namely, by installing the additional module in the image forming device 100, a new image forming device 100 having an additional function can be provided without affecting the functions of the image forming device 100 at the stage of production.

Furthermore, since the startup in the standard operation mode can be temporarily enabled even in a state in which an additional module has been installed, it is also possible to perform changing and acquisition of device settings, acquisition of log information storing conditions of the device, and so forth on the device in which the additional module has been installed, by using the standard software of the image forming device 100. In other words, the additional module does not need to have a function for implementing the standard operation mode.

(2) Second Embodiment (2-1) Configuration

Figure 11:
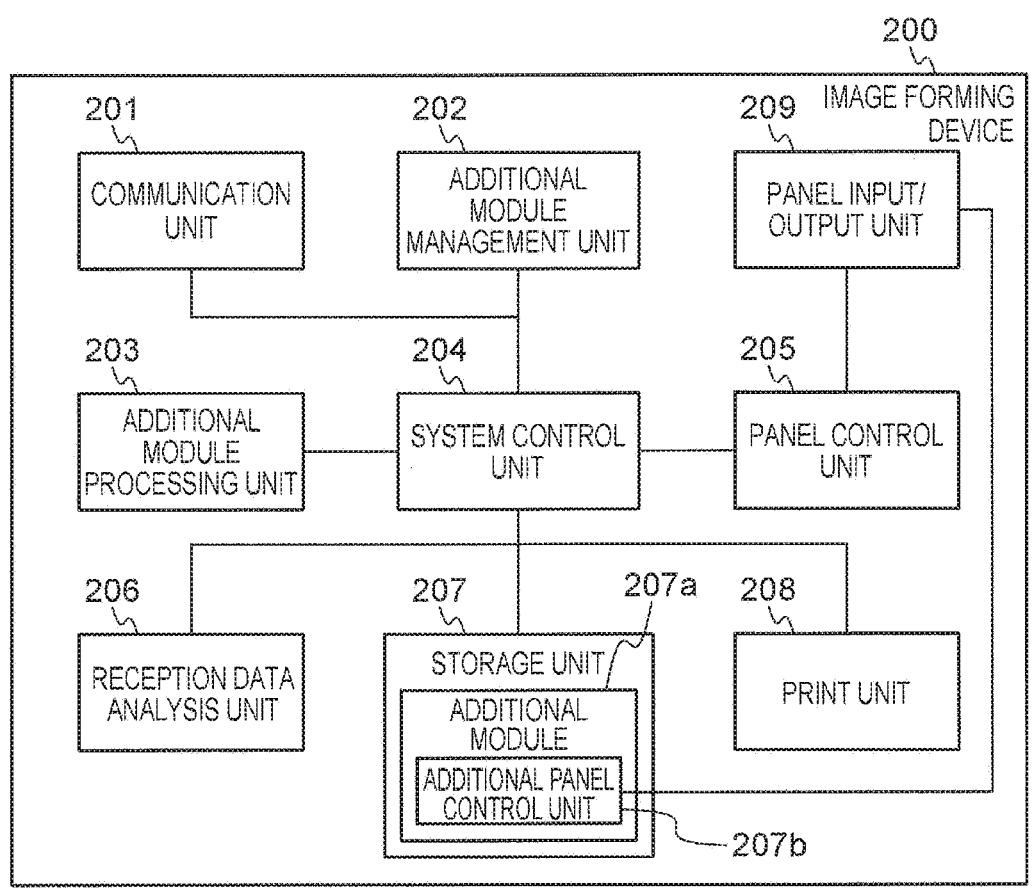
FIG. 11 is a functional block diagram schematically showing the configuration of an image forming device according to a second embodiment of the present invention.

FIG. 11 is a functional block diagram schematically showing the configuration of an image forming device 200 according to a second embodiment of the present invention. In the second embodiment, a description will be given of a case where the image forming device 200 is a printer. As shown in FIG. 11, the image forming device 200 includes a communication unit 201, an additional module management unit 202, an additional module processing unit 203, a system control unit 204, a panel control unit 205, a reception data analysis unit 206, a storage unit 207, a print unit 208 and a panel input/output unit 209. The image forming device 200 according to the second embodiment differs from the image forming device 100 according to the first embodiment in including the panel input/output unit 209 and in that an additional module 207a has a function as an additional panel control unit 207b. Incidentally, the components 201 to 208 in FIG. 11 have functions similar to those of the components 101 to 108 in FIG. 1.

The panel input/output unit 209 is a touch panel, for example. The panel 1 input/output unit 209 has a function as a display device for displaying buttons. Or the like to be operated by the user and a function as an input device for receiving user operations such as pressing a button. The panel input/output unit 209 displays the status of the image forming device 200, for example. The panel control unit 205 controls the operation of the panel input/output unit 209 in the standard operation mode. The additional panel control unit 207b controls the operation of the panel input/output unit 209 in the additional operation mode.

The communication unit 201 receives data such as a print job and installation data of an additional module in which a panel control unit has been implemented. The reception data analysis unit 206 analyzes the data received by the communication unit 201 and executes a process according to the received data. In a case where the data analyzed by the reception data analysis unit 206 is a print job, the print unit 208 acquires print data from the reception data analysis unit 206 and executes a print process based on the print data. In a case where the data analyzed by the reception data analysis unit 206 is additional module data, the additional module 207a is stored in the storage unit 207.

The additional module 207a includes the additional panel control unit 207b as a program for controlling the panel input/output unit 209 in the additional operation mode. The additional module 207a stored in the storage unit 207 operates as a loading program at the startup of the image forming device 200 according to a command from the additional module management unit 202. The additional module processing unit 203 includes an interface to be used by the additional module 207a and receives a request from the additional module 207a. The system control unit 204 performs centralized control over the communication unit 201, the reception data analysis unit 206, the storage unit 207, the print unit 208, the panel input/output unit 209, the panel control unit 105, the additional module management unit 202 and the additional module processing unit 203, and thereby implements the functions as the image forming device 200.

The image forming device 200 is capable of installing the additional module 207a in the storage unit 207 by receiving a program module to operate on the image forming device 200 and installing the program module. The image forming device 200 is capable of operating in an operation mode corresponding to each of installed program modules. The image forming device 200 can be set to the standard operation mode as the operation mode based on functions incorporated at the stage of production or the additional operation mode as the operation mode based on functions provided by an additional module as a newly installed program module. In the second embodiment, the storage unit 207 and the additional module management unit 202 constitute a second processing unit that makes the panel input/output unit 209 execute a process according to the additional operation mode. Further, in the second embodiment, the panel control unit 205 constitutes a first processing unit that makes the panel input/output unit 209 execute a process according to the standard operation mode.

The image forming device 200 sets the operation mode to the standard operation mode in a case where no additional module 207a has been installed in the storage unit 207 at the time of the startup of the image forming device 200. The image forming device 200 sets the operation mode to the additional operation mode in a case where an additional module 207a has been installed in the storage unit 207 at the time of the startup of the image forming device 200.

Incidentally, the communication unit 201, the additional module management unit 202, the additional module processing unit 203, the system control unit 204, the panel control unit 205 and the reception data analysis unit 206 shown in FIG. 11 can be implemented by a program stored in the storage unit 207 and a processor as an information processing device that executes the program. It is also possible to implement part of the communication unit 201, the additional module management unit 202, the additional module processing unit 203, the system control unit 204, the panel control unit 205 and the reception data analysis unit 206 shown in FIG. 11 by a program stored in the storage unit 207 and a processor that executes the program.

(2-2) Operation

Figure 12:
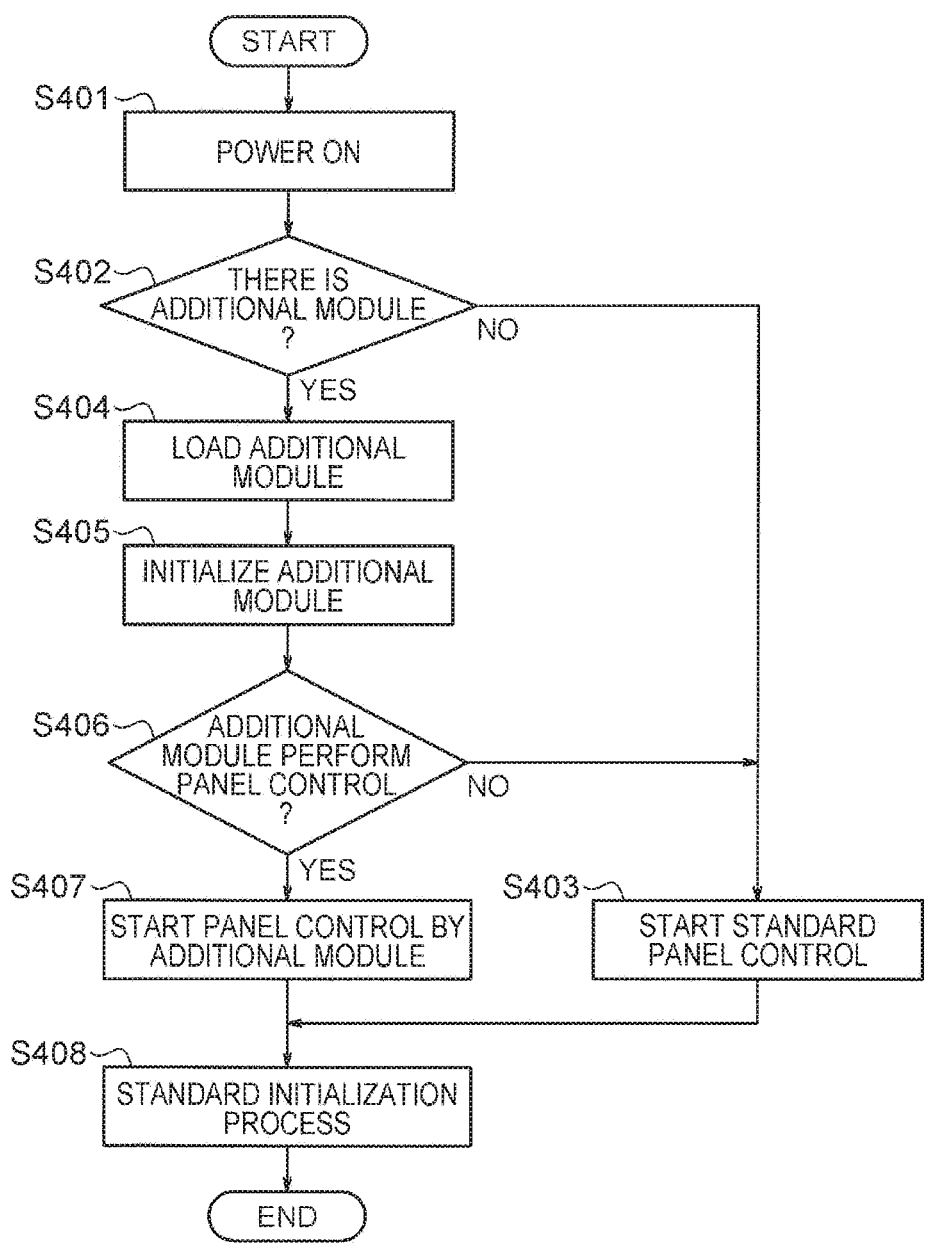
FIG. 12 is a flowchart showing an operation mode setting process performed by the image forming device according to the second embodiment.
Figure 13:
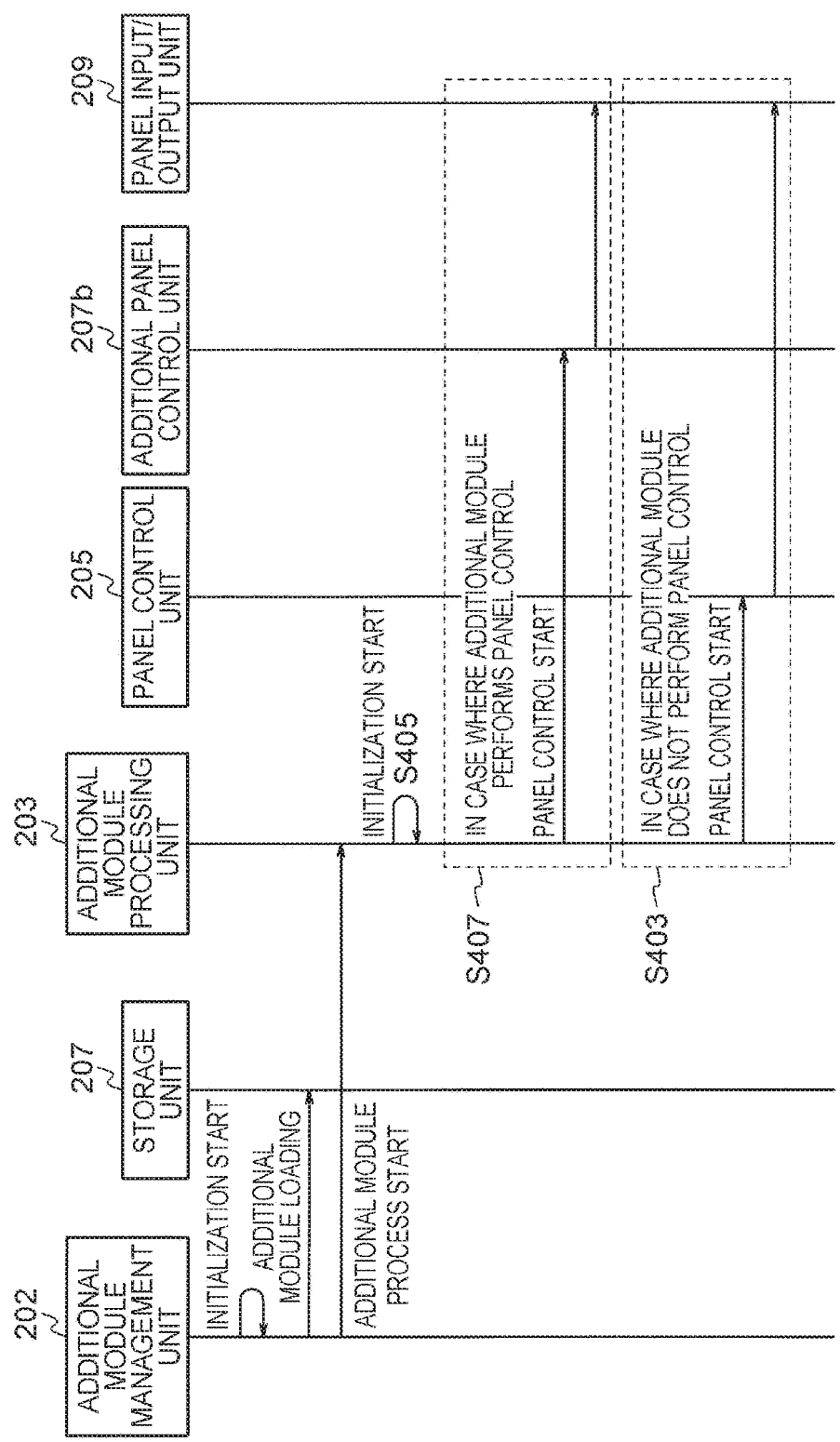
FIG. 13 is a sequence chart showing a process at the time of device startup performed by the image forming device according to the second embodiment.

FIG. 12 is a flowchart showing an operation mode setting process performed by the image forming device 200. FIG. 13 is a sequence chart shewing a process at the time of device startup performed by the image forming device 200. First, in step S401, when the power of the image forming device 200 is turned ON, the additional module management unit 202 and the additional module processing unit 203 perform an initialization process of the device.

In the next step S402, during the initialization process of the device, the additional module management unit 202 makes a judgment on whether or not an additional module 207a has been installed in the storage unit 207 of the device, that is, a judgment on whether or not additional module data has been stored.

In a case where no additional module 207a has been installed in the storage unit 207 of the device in the step S402, the process advances to step S403, the operation mode is set to the standard operation mode, and the standard panel control unit 205 is commanded to carry out the control of the panel input/output unit 209.

In a case where the additional module 207a has been installed in the storage unit 207 of the device in the step S402, the process advances to step S404 and the additional module management unit 202 loads the additional module 207a from the storage unit 207 at the stage of the initialization at the device startup.

In step S405, after the loading of the additional module 207a, the additional module management unit 202 issues a process start command regarding the additional module 207a to the additional module processing unit 203 and performs the initialization process of the additional module 207a.

In step S406, at the time of initialization of the additional module 207a, the additional module management unit 202 performs a judgment process on whether the installed additional module 207a performs the panel control or not. In a case where the additional module 207a does not perform the panel control, the additional module processing unit 203 commands the device standard panel control unit 205 to start the panel control, and the panel input/output unit 209 performs panel display and detection of the button press according to commands from the panel control unit 205.

In step S407, in a case where the additional module 207a performs the panel control, the additional module processing unit 203 commands the additional panel control unit 207b stored in the storage unit 207 to start the panel control and switches the process so that the additional panel control unit 207b performs the panel display and the detection of the button press on the panel input/output unit 209.

In step S408, an initialization process of the device except for the panel control is performed.

Figure 14:
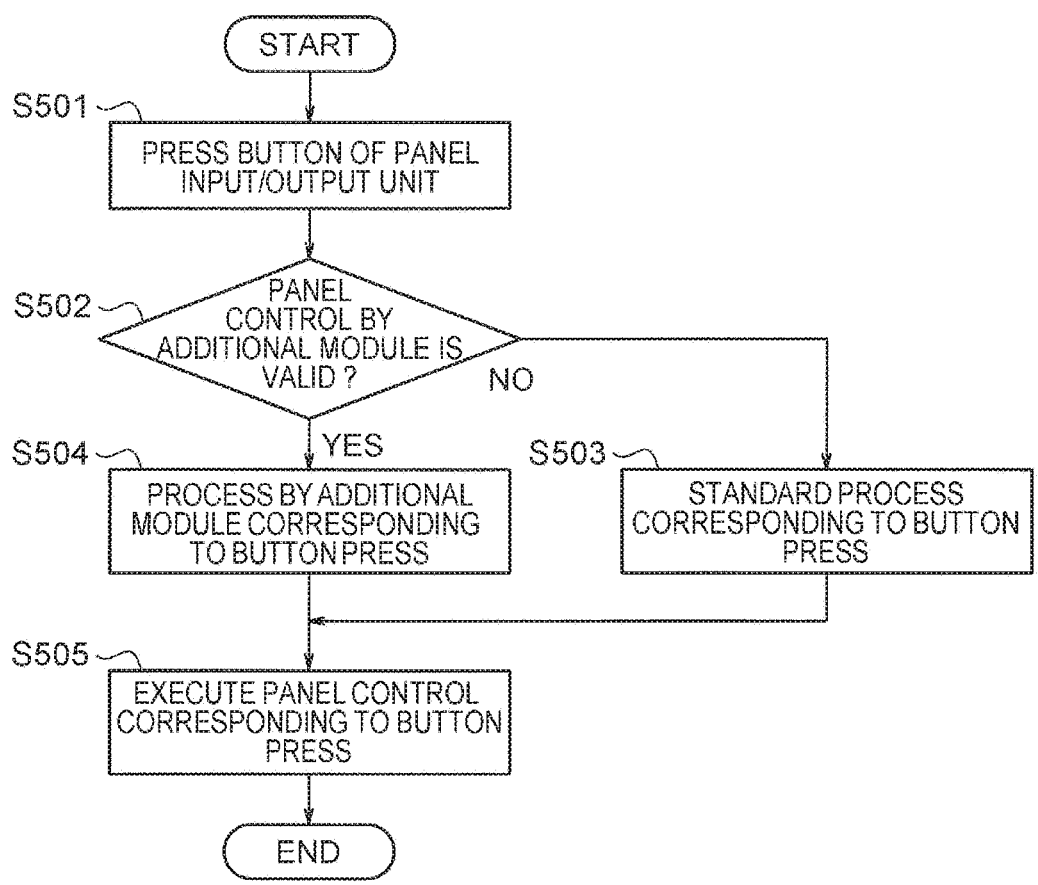
FIG. 14 is a flowchart Showing a process at the time of panel operation in the additional operation mode performed by the image forming device according to the second embodiment.
Figure 15:
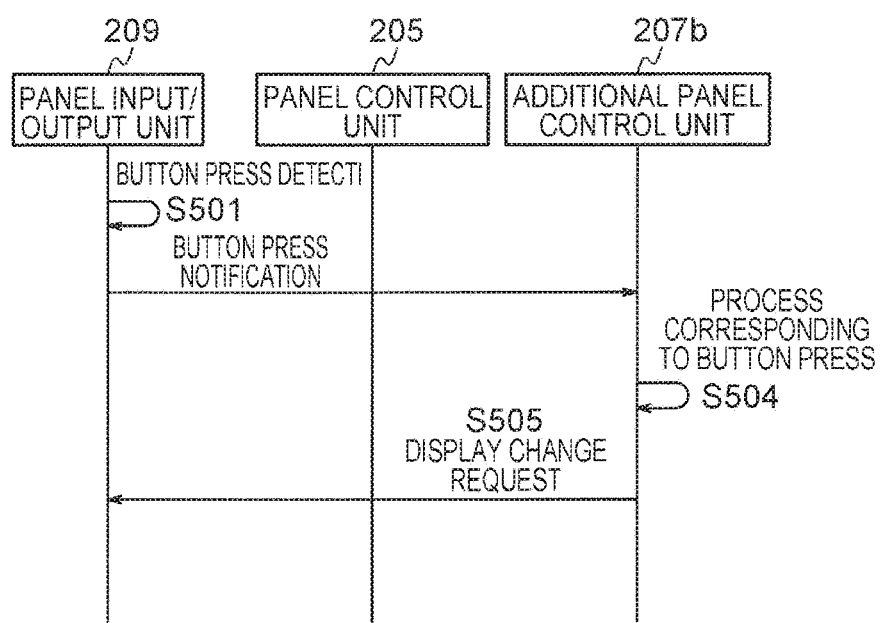
FIG. 15 is a sequence chart showing the process at the time of panel operation in the additional operation mode performed by the image forming device according to the second embodiment.

FIG. 14 is a flowchart showing a process at the time of panel operation in the additional operation mode performed by the image forming device 200. FIG. 15 is a sequence chart snowing the process at the time of panel operation in the additional operation mode performed by the it forming device 200. The additional operation mode represents a state in which the startup of the image forming device 200 has been completed and the control by the additional module 207a has been enabled.

In step S501, after the completion of the startup of the device, the user presses a button of the panel input/output unit 209. When, a button on the panel input/output unit 209 is pressed, the panel input/output unit 209 detects the button press. In step S502, the additional module management unit 202 judges whether the panel control by the additional module 207a is in progress or not. In a case where the panel control by the additional module 207a is invalid, the process advances from the step S502 to step S503 and the operation mode is set to the standard operation mode. In a case where the panel control by the additional nodule 207a is valid, the process advances from the step S502 to step S504 and the operation mode is set to the additional operation mode.

Figure 16:
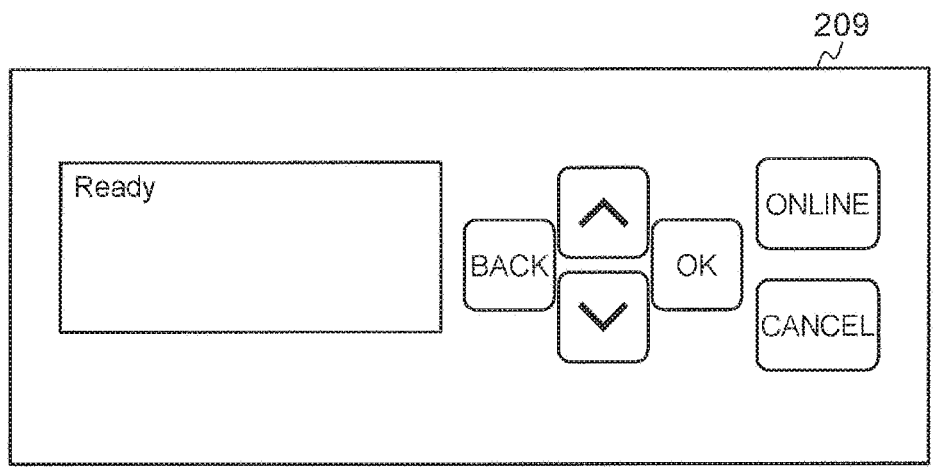
FIG. 16 is a diagram showing an example of a standby screen as a display screen in the standard operation mode in the image forming device according to the second embodiment.

In the step S503, a notification of the button press on the panel input/output unit 209 is sent to the panel control unit 205. The panel control unit 205 executes a process corresponding to the button press. FIG. 16 is a diagram showing an example of a standby screen as a display screen on the image forming device 200 in the standard operation mode.

Figure 17:
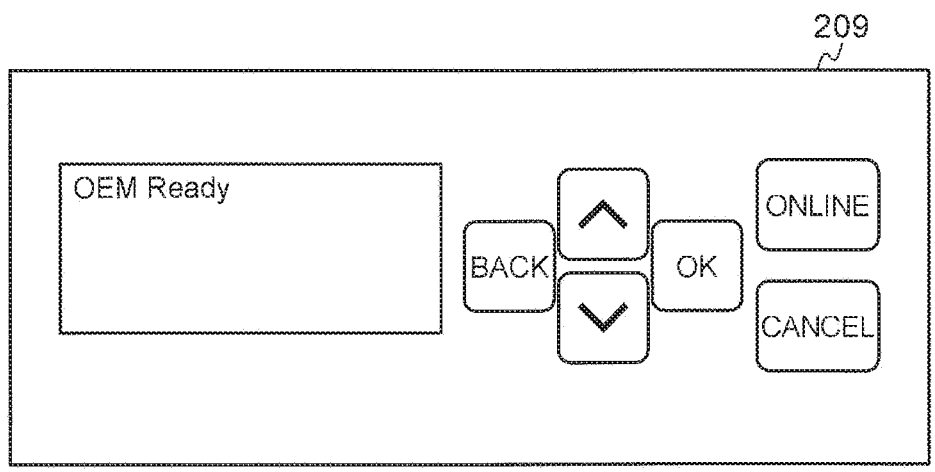
FIG. 17 is a diagram showing an example of a standby screen as a display screen in the additional operation mode in the image forming device according to the second embodiment.

In the step S504, in a case where the panel control by the additional module 207a is valid, the notification of the button press on the panel input/output unit 209 is sent to the additional panel control unit 207b. The additional panel control unit 207b executes a process corresponding to the button press. FIG. 17 is a diagram showing an example of a standby screen as a display screen on the image forming device 200 in the additional operation mode.

In step S505, after the process by the panel control unit 205 or the additional panel control unit 207b corresponding to the button press, panel display corresponding to the button press is made on the panel input/output unit 209.

Figure 18:
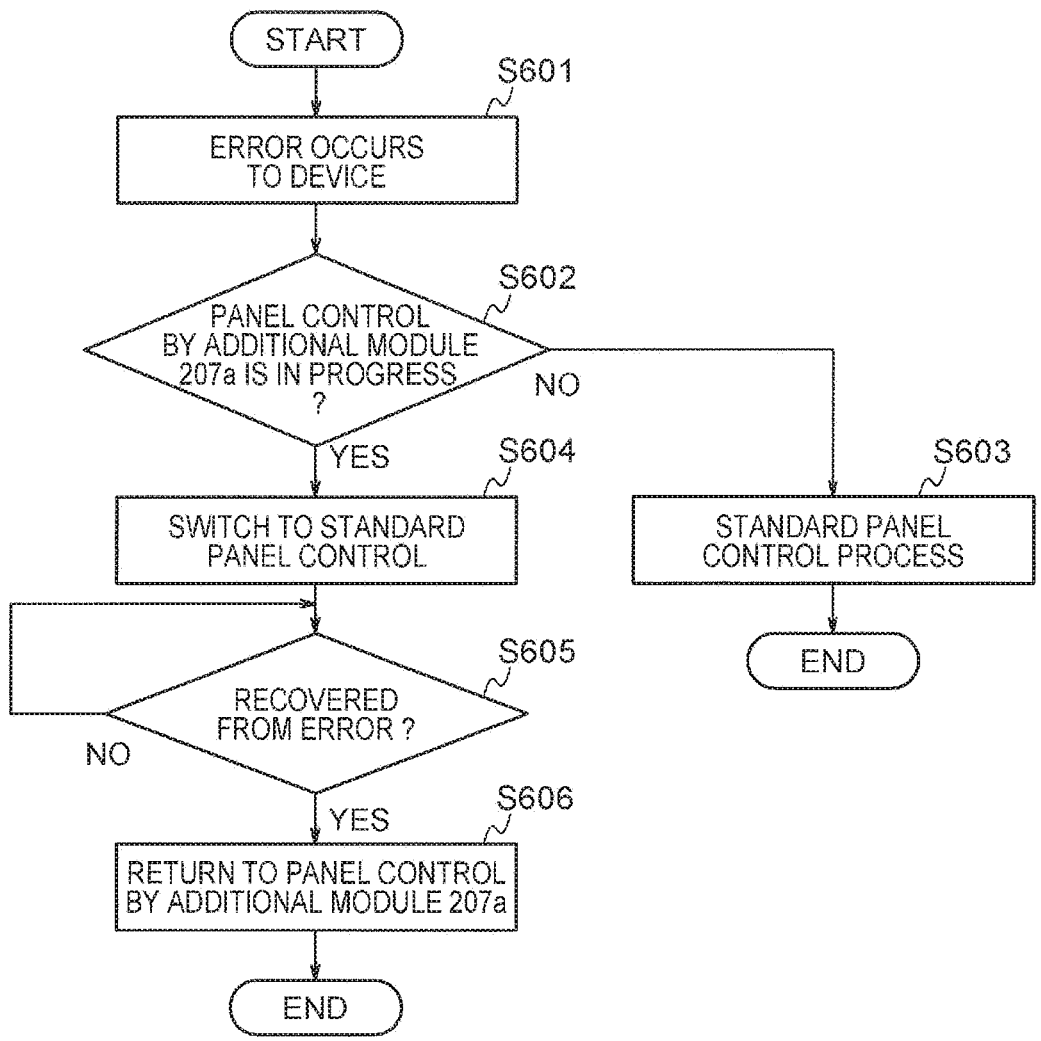
FIG. 18 is a flowchart showing a process at the time of the occurrence of an error performed by the image forming device according to the second embodiment.
Figure 19:
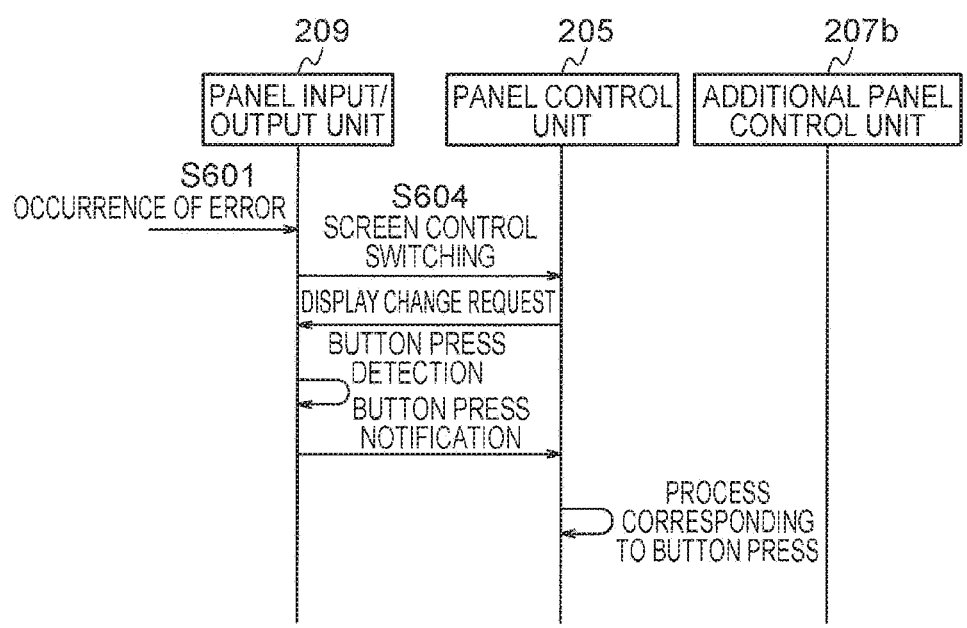
FIG. 19 is a sequence chart showing the process at the time of the occurrence of an error performed by the image forming device according to the second embodiment.

FIG. 18 is a flowchart showing a process at the time of the occurrence of an error performed by the image forming device 200. FIG. 19 is a sequence chart showing the process at the time of the occurrence of an error performed by the image forming device 200. In step S601, a notification of the occurrence of an error during the use of the image forming device 200 is sent to the panel input/output unit 209. The error mentioned here can be, for example, a situation in which toner empty of the device has occurred, a situation in which a paper jam has occurred, a situation in which a fixation unit has come to the end of its operating life, and so on, which are dependent on the condition of the device at the time of occurrence of failure.

Figure 20:
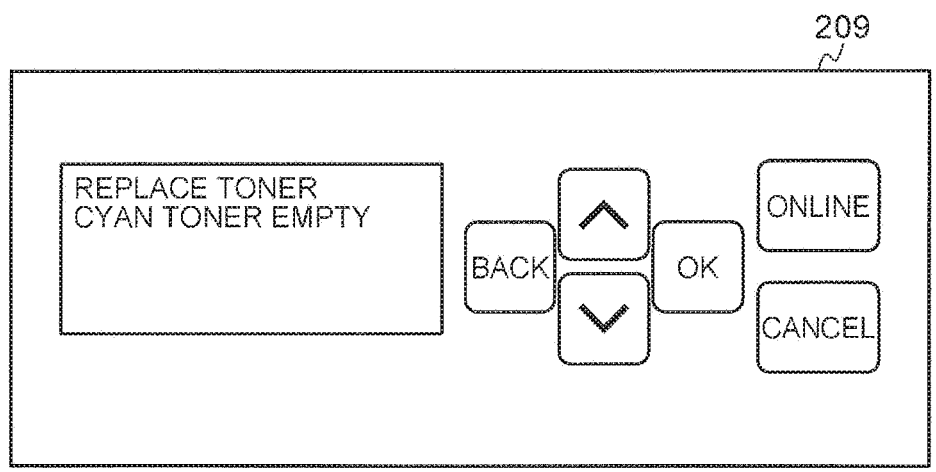
FIG. 20 is a diagram showing an example of a display screen at the time of the occurrence of toner empty in the image forming device according to the second embodiment.

FIG. 20 is a diagram showing an example of a display screen on the image forming device 200 at the time of the occurrence of toner empty. FIG. 20 shows a display prompting toner replacement and a display of the type of the toner which is empty.

Figure 21:
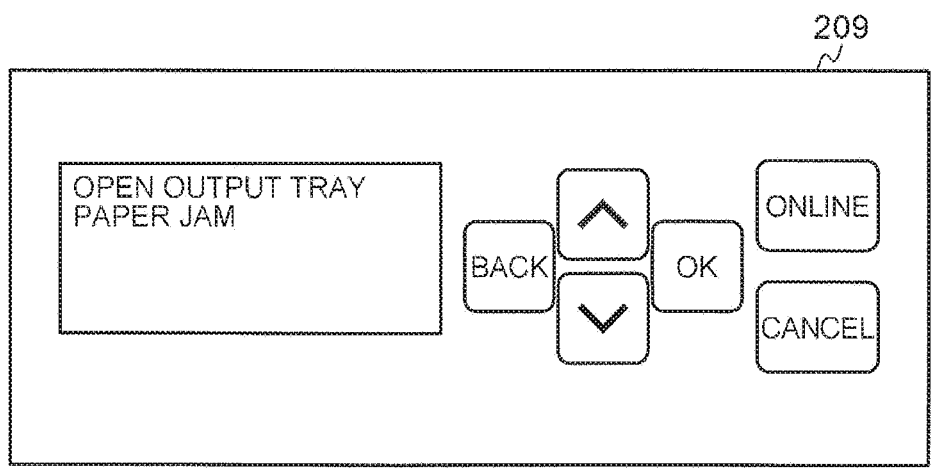
FIG. 21 is a diagram showing an example of a display screen at the time of the occurrence of a paper jam in the image forming device according to the second embodiment.

FIG. 21 is a diagram showing an example of a display screen on the image forming device 200 at the time of the occurrence of a paper jam. FIG. 21 shows a display instructing the user to open an output tray and a display notifying of the occurrence of the paper jam.

Figure 22:
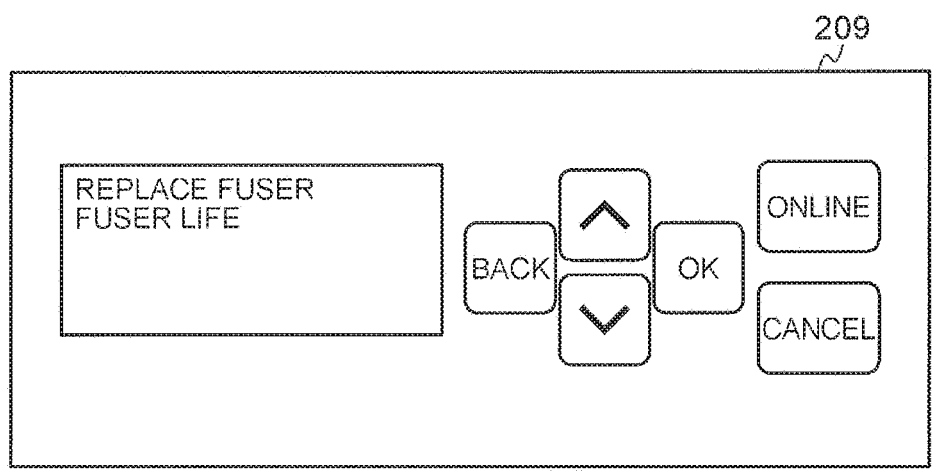
FIG. 22 is a diagram showing an example of a display screen when a fixation unit has come to the end of its operating life in the image forming device according to the second embodiment.

FIG. 22 is a diagram showing an example of a display screen on the image forming device 200 when the fixation unit has come to the end of its operating life. FIG. 22 shows a display prompting replacement of the fixation unit and a display notifying that the fixation unit has demo to the end of its operating life.

In step S602 in FIG. 18, the additional Module Management unit 202 performs a judgment process on whether the panel control by the additional module 207a is in progress or not.

If the panel control according to the additional operation mode based on the additional module 207a is Pot in progress, the process advances from the step S602 to step S603 and an error is displayed on the panel input/output unit 209 from the panel control unit 205 of the device standard.

If the panel control according to the additional operation mode based on the additional module 207a is in progress, the process advances from the step S602 to step S604 and the panel control is switched upon the notification of the error of the device from the panel control by the additional module 207a to the panel control by the device standard panel control unit 205.

When the panel input/output unit 209 is notified of the occurrence of an error, the operation mode is switched from the additional operation mode based on the additional Module 207a to the standard operation mode based on the device standard panel control unit 205. In this case, the panel input/output unit 209 switches the panel display according to a display change request from the panel control unit 205. The process corresponding to the detection of the button press on the panel input/output unit 209 during the occurrence of an error 18 also switched to a process by the panel control unit 205.

In step S605, the image forming device 200 judges whether or not the device has recovered from the error.

In step S606, when the image forming device 200 has recovered from the error, the panel control is switched again to the control in the additional operation mode based on the additional panel control unit 207b. Thanks to the operation switching, it becomes only necessary to incorporate panel control necessary for the OEM (Original Equipment Manufacturer reseller in the additional Module 207a and it becomes unnecessary to consider panel control to be performed at the time of occurrence of an error dependent on the condition of the device.

(2-3) Effect

As described above, with the image forming device 200 according to the second embodiment, the installation of the additional module 20a in which panel control according to specifications requested by the OEM reseller has been implemented enables the image forming device 200 to implement screen display and input operation reception according to the specifications requested by the OEM reseller.

The panel control at the time of occurrence of an error dependent on the condition of the device is performed by the device standard panel control unit 205 even when the operation mode is set to the additional operation mode based on the additional module 207a. Further, when the device has recovered from the error, the device automatically returns to the state in which the operation mode is set to the additional operation mode. Thus, it is sufficient that the OEM reseller that generates the additional module 207a installs an additional module that executes necessary panel control only. In other words, the producer of the additional module is relieved of the need to consider the panel control to be performed at the time of occurrence of an error of the device and the load on the OEM reseller producing the additional module 207a decreases.

Incidentally, configurations in the above-described first and second embodiments can be properly combined with each other.

The invention being thus described, it will be obvious that the sane may be varied in many ways. Such variations are not to be regarded as a departure from the spirit and scope of the invention, and all such modifications as would be obvious to one skilled in the art are intended to be included within the scope of following claims.

What is claimed is:

1. An image forming device that forms an image on a print medium, comprising:
   a printer that executes a process for printing;
   a memory;
   a first processor that makes the printer execute a first process when an operation mode of the image forming device is a previously provided standard operation mode;
   a controller that stores an additional module in the memory by receiving a program module which operates on the image forming device and installing the program module; and
   a second processor that executes the additional module and thereby makes the printer execute a second process when the operation mode is an additional operation mode, wherein
   the controller sets the operation mode to the standard operation mode in a case where the additional module has not been installed at a time of startup of the image forming device and sets the operation mode to the additional operation mode in a case where the additional module has been installed at the time of startup of the image forming device,
   the printer executes a print process for forming an image on a print medium,
   when the operation mode is set to the standard operation mode, the first processor provides the printer with print data based on reception data received by the image forming device, and
   when the operation mode is set to the additional operation mode, the second processor executes the additional module and thereby provides the printer with print data based on reception data received by the image forming device.

2. The image forming device according to claim 1, wherein
   the printer includes a touch panel that displays information and receives a user operation,
   when the operation mode is set to the standard operation mode, the touch panel executes the first process, and
   when the operation mode is set to the additional operation mode, the additional module is executed and thereby the touch panel executes the second process.

3. The image forming device according to claim 2, wherein
   the first processor is a panel controller,
   the second processor is an additional panel controller as a part of the additional module,
   when the operation mode is set to the standard operation mode, the panel controller controls display and reception of an input on the touch panel, and
   when the operation mode is set to the additional operation mode, the additional panel controller controls the display and the reception of the input on the touch panel.

4. The image forming device according to claim 3, wherein in a case where notification of occurrence of failure in the image forming device is made when the operation mode has been set to the additional operation mode, the control of the display and the reception of the input on the touch panel is switched to control by the panel controller and the panel controller controls the touch panel so as to make the notification of the occurrence of the failure.

5. The image forming device according to claim 4, wherein the control of the display and the reception of the input on the touch panel is returned to control by the additional panel controller in a case where the failure has been recovered when the notification of the occurrence of the failure in the image forming device is made.

6. The image forming device according to claim 1, wherein the controller sets the operation mode at a time of next startup to the standard operation mode when command information requesting startup in the standard operation mode at the time of the next startup is stored.

* * * * *